(No Model.)
W. F. GOULD.
BALANCING SLIDE VALVE.
No. 594,868. Patented Dec. 7, 1897.
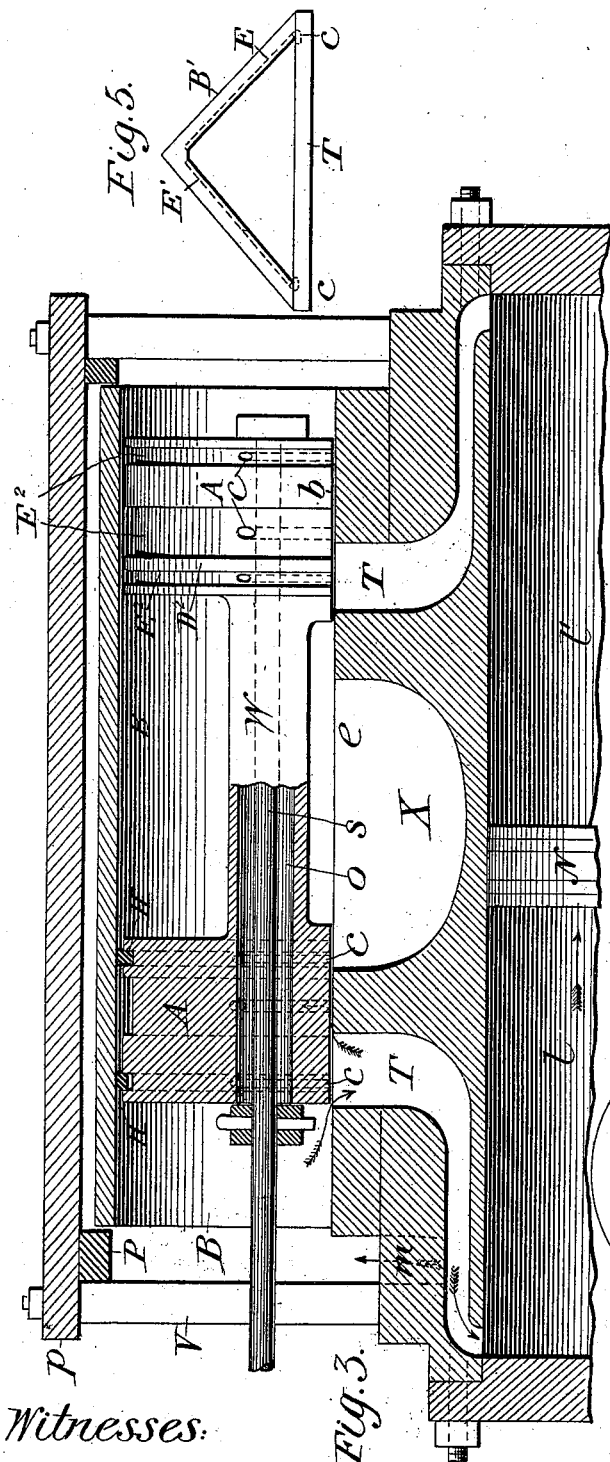
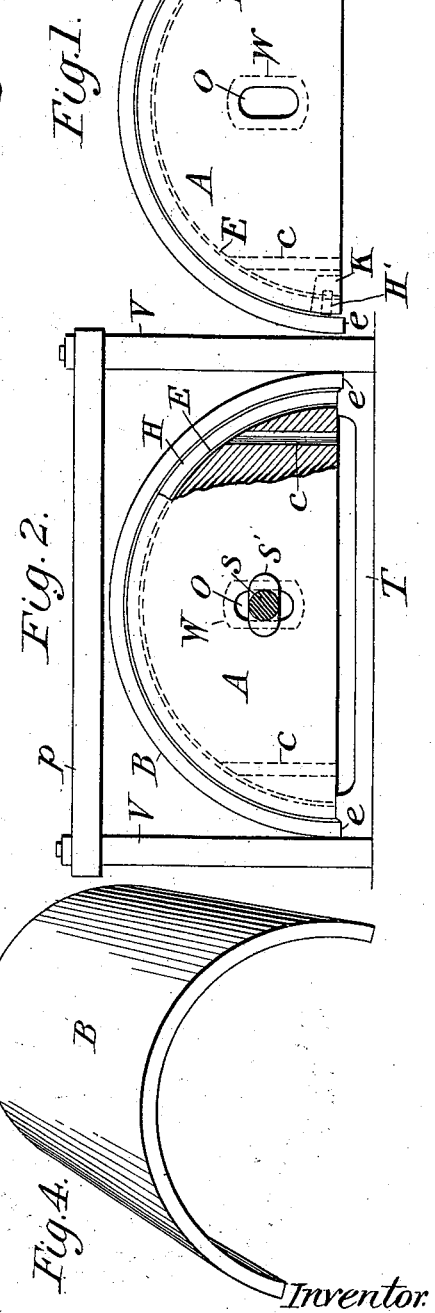
Witnesses:
William Campbell
Willis S Hufford
Inventor
William F. Gould

UNITED STATES PATENT OFFICE.

WILLIAM F. GOULD, OF DES MOINES, IOWA.

BALANCING SLIDE-VALVE.

SPECIFICATION forming part of Letters Patent No. 594,868, dated December 7, 1897.

Application filed June 25, 1894. Serial No. 515,710. (No model.)

*To all whom it may concern:*

Be it known that I, WILLIAM F. GOULD, a citizen of the United States, residing in Des Moines, in the county of Polk and State of Iowa, have invented a new and useful Method of Balancing Slide-Valves for Steam-Engines, of which the following is a specification.

The object of my invention is to provide and maintain steam-tight chambers in a valve while it is in motion in such a manner that there will be sufficient steam confined in said chambers to keep the valve balanced on the valve-seat, and I accomplish this desideratum as hereinafter set forth, pointed out in my claims, and illustrated in the accompanying drawings, in which—

Figure 1 is a transverse sectional view of a semicircular valve. Fig. 2 is a transverse sectional view of a steam-chest, a valve, and valve-cover. Fig. 3 is a longitudinal sectional view showing a valve, a valve-cover, and steam-chest in position on the top portion of a cylinder as required for practical use. Fig. 4 is a perspective view of a valve-cover. Fig. 5 is a sectional view of a valve that is triangular in cross-section.

The letter A designates a valve, and B a valve-cover.

D and $D^2$ are integral mating pairs of solid wings on the end portions of the central part of the valve, and the space between said wings is an exhaust-chamber. Each of these wings has grooves in its periphery and in the grooves packing-rings H, by means of which wings and packing a steam-tight chamber is produced on the top surface only of each end of the valve when the packing is in contact with the inner surface of a valve-cover or the cover of a steam-chest in such a manner that the said chambers will be maintained steam-tight while the valve is in motion and virtually not in contact with the valve-cover on account of the packing projecting slightly beyond the periphery of the wings of the valve. Ports C are adapted to admit steam from the cylinder into the chambers existing between the packings in the grooves of the wings D and $D^2$ for the purpose of maintaining the valve balanced while in motion. In the open space between the wings D and $D^2$ it is obvious no ports are required to admit steam from the cylinder into the open spaces or steam-tight chambers. The space between the two distinct packings H in each of the wings D and $D^2$ preferably has a recessed surface or chamber $E^2$ to admit steam into the chamber every time that port is in communication with the induction-ports of the cylinder.

It is obvious that the form of a valve may be semicircular or angular and the width and depth of the chambers in the wings D and $D^2$ varied as desired and as required in the practical operation of a slide-valve.

In the practical operation of my invention the steam-chambers maintained between the packings H H at each end of the valve are alternately filled with live steam through the ports communicating therewith as the valve is reciprocated on the valve-seat, and a balance of the valve is thereby maintained continuously at all times while the valve is in motion.

I claim as my invention—

1. In a slide-valve, a steam-chamber at each end portion thereof maintained steam-tight by means of packing fitted in grooves at the ends of the valve to project outward beyond the surface of the grooved parts to engage a valve-cover at all times while the valve is in motion and ports extending through the ends of the valve to communicate with said chambers and ports in the cylinder.

2. A balanced valve having a flat bottom fitted to a flat seat connected with a cylinder provided with steam-induction ports and an exhaust-port between the said induction-ports, wings at each end of the valve extending from the flat bottom over the top and each wing provided with two grooves, a packing fitted in each groove to project outward beyond the surface of the wings, and steam-ports extending from top to bottom through said wings and a recess or chamber between the wings to alternately communicate with the induction-ports to be alternately filled with live steam in the manner set forth, while the valve is in motion.

WILLIAM F. GOULD.

Witnesses:
ANDREW S. RUNDBERG,
JESSE B. SNYDER.